(12) United States Patent
Fokoue-Nkoutche et al.

(10) Patent No.: US 11,500,841 B2
(45) Date of Patent: Nov. 15, 2022

(54) ENCODING AND DECODING TREE DATA STRUCTURES AS VECTOR DATA STRUCTURES

(71) Applicant: International Business Machines Corporation, Armonk, NY (US)

(72) Inventors: Achille Fokoue-Nkoutche, White Plains, NY (US); Maxwell Crouse, Chicago, IL (US); Michael Witbrock, Ossining, NY (US); Ryan A. Musa, New York City, NY (US); Maria Chang, Irvington, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 317 days.

(21) Appl. No.: 16/240,019

(22) Filed: Jan. 4, 2019

(65) Prior Publication Data

US 2020/0218706 A1 Jul. 9, 2020

(51) Int. Cl.
*G06F 16/22* (2019.01)
*G06N 20/00* (2019.01)

(52) U.S. Cl.
CPC ...... *G06F 16/2246* (2019.01); *G06F 16/2237* (2019.01); *G06N 20/00* (2019.01)

(58) Field of Classification Search
CPC ............ G06F 16/2246; G06F 16/2237; G06F 16/9027; G06N 20/00; G06N 3/0445; G06N 7/005; G06N 5/006
See application file for complete search history.

(56) References Cited

U.S. PATENT DOCUMENTS

| | | | |
|---|---|---|---|
| 6,941,318 B1 | 9/2005 | Tamayo et al. | |
| 7,130,833 B2 | 10/2006 | Kashima et al. | |
| 7,251,637 B1 | 7/2007 | Caid et al. | |
| 9,589,006 B2 | 3/2017 | Boldyrev et al. | |
| 10,534,799 B1* | 1/2020 | Gupta | G06F 16/258 |
| 2009/0077009 A1* | 3/2009 | Miszczyk | G06F 16/94 |
| 2009/0222473 A1* | 9/2009 | Chowdhury | G06F 16/9027 |
| 2011/0208703 A1* | 8/2011 | Fisher | G06F 16/88 |
| | | | 707/692 |

(Continued)

OTHER PUBLICATIONS

Lorenzo Ferrone, Fabio Massimo Zanzotto, Xavier Carreas, What is inside Distributed Representations? Encoding and Decoding Structures in Vectors without Learning, Mar. 11, 2016, pp. 1-26.*

(Continued)

*Primary Examiner* — Cam Y T Truong
(74) *Attorney, Agent, or Firm* — Amin, Turocy & Watson, LLP

(57) ABSTRACT

Systems, computer-implemented methods, and computer program products that can facilitate encoding a tree data structure into a vector based on a set of constraints are provided. According to an embodiment, a system can comprise a memory that stores computer executable components and a processor that executes the computer executable components stored in the memory. The computer executable components can comprise a constraint former that can form a set of constraints based on a first tree data structure and a vector encoder that can encode the first tree data structure into a vector based on the set of constraints.

19 Claims, 10 Drawing Sheets

(56) References Cited

U.S. PATENT DOCUMENTS

| | | | | |
|---|---|---|---|---|
| 2012/0185489 | A1* | 7/2012 | Shah | G06Q 30/06 |
| | | | | 707/749 |
| 2013/0346451 | A1* | 12/2013 | Zhou | H03M 7/30 |
| | | | | 707/797 |
| 2014/0189292 | A1 | 7/2014 | Ioffe et al. | |
| 2016/0034825 | A1* | 2/2016 | Ezick | G06N 7/00 |
| | | | | 706/12 |
| 2016/0070767 | A1* | 3/2016 | Karras | G06T 15/06 |
| | | | | 707/602 |
| 2016/0150230 | A1* | 5/2016 | He | H04N 19/44 |
| | | | | 375/240.03 |
| 2017/0187445 | A1* | 6/2017 | Khsiba | H04B 7/08 |
| 2017/0294986 | A1* | 10/2017 | Khsiba | H04L 5/006 |
| 2018/0373986 | A1* | 12/2018 | Rainwater | G06F 11/36 |
| 2019/0108449 | A1* | 4/2019 | Johnson | G06F 16/2246 |
| 2019/0220453 | A1* | 7/2019 | Douglas | G06F 16/2237 |
| 2019/0370389 | A1* | 12/2019 | Blouw | G06N 3/084 |
| 2021/0185066 | A1* | 6/2021 | Shah | G06N 20/10 |

OTHER PUBLICATIONS

Anisimov, A. V., et al. "Representation of Ordered Trees." Cybern Syst Anal (1980) 16: 339. https://doi.org/10.1007/BF01078252. 7 pages.

Jakubuv, Jan, et al. "ENIGMA: Efficient Learning-based Inference Guiding Machine." International Conference on Intelligent Computer Mathematics. Springer, Cham, 2017. htps://arxiv.org/pdf/1701.06532.pdf. 9 pages.

Kuhlwein, Daniel, et al. "MaSh: Machine Learning for Sledgehammer." IITP'13 Proceedings of the 4th international conference on Interactive Theorem Proving pp. 35-50. htp://isabelle.in.tum.de/~blanchet/mash.pdf. 16 pages.

Kaliszyk, Cezary, et al. "Efficient Semantic Features for Automated Reasoning over Large Theories." Proceedings of the Twenty-Fourth International Joint Conference on Artificial Intelligence (IJCAI 2015) 3084. 7 pages.

Toutanova, Kristina, et al. "The Leaf Projection Path View of Parse Trees: Exploring String Kernels for HPSG Parse Selection." Proceedings of the 2004 Conference on Empirical Methods in Natural Language Processing 8 pages.

Biere, Armin "PicoSAT Essentials." Journal on Satisfiability, Boolean Modeling and Computation 4 (2008) 75-97. 23 pages.

Borgwardt, Karsten M, et al. "Shortest-path kernels on graphs." Proc. 5th IEEE Int. Conf. on Data Mining (ICDM'05), Houston, TX, 2005. 8 pages.

Brown, Peter F., et al. "Class-Based n-gram Models of Natural Language." Comput. Linguist. 18(4):467-479. 1992. 14 pages.

Forbus, KD, et al. "Extending SME to Handle Large-Scale Cognitive Modeling." Cognitive Science 41(5):1152-1201. Jun. 20, 2016. https://doi.org/10.1111/cogs.12377. 50 pages.

Gartner, Thomas, et al. "In Learning Theory and Kernel Machines." Springer. 129-143. 2003. 15 pages.

Haussler, David. "Convolution Kernels on Discrete Structures." Technical report, Technical report, Department of Computer Science, University of California at Santa Cruz.Jul. 8, 1999. 38 pages.

Hochreiter, Sepp, et al. "Long Short-Term Memory.". Neural Computation 9(8):1735-1780, 1997. 32 pages.

Horvath, Tamas, et al. "Cyclic Pattern Kernels for Predictive Graph Mining." KDD 2004. 10.1145/1014052.1014072. 10 pages.

Tai, Kai Sheng, et al. Improved Semantic Representations From Tree-Structured Long Short-Term Memory Networks. arXiv:1503.00075v3 [cs.CL] May 30, 2015. 11 pages.

Johnson, Donald B. "Finding all the elementary circuits of a directed graph." SIAM Journal on Computing 4(1):77-84. Mar. 1975. 8 pages.

Mahe, Pierre, et al. "Graph kernels based on tree patterns for molecules." ccsd-00095488, version 1—Sep. 15, 2006. 31 pages.

Kashima, Hisashi, et al. "Marginalized Kernels Getween Labeled Graphs." Proceedings of the 20th international conference on machine learning (ICML-03), 321-328. 2003. 8 pages.

Kiros, Ryan, et al. "Skip-Thought Vectors." Advances in neural information processing systems, 3294-3302. arXiv:1506.06726v1 [cs.CL] Jun. 22, 2015. 11 pages.

Mikolov, Tomas, et al. "Distributed Representations of Words and Phrases and their Compositionality." Advances in Neural Information Processing Systems, 3111-3119. 2013. 9 pages.

Miwa, Makoto, et al. "End-to-End Relation Extraction using LSTMs on Sequences and Tree Structures." Association for Computational Linguistics (ACL), 2016. 13 pages.

Moschitti, Alessandro, et al. "Tree Kernels for Semantic Role Labeling." Computational Linguistics. Jun. 2008. 32 pages.

Moschitti, Alessandro. "Making Tree Kernels practical for Natural Language Learning." 1th conference of the European Chapter of the Association for Computational Linguistics. 2006. 8 pages.

Rieck, Konrad, et al. "Approximate Tree Kernels." Journal of Machine Learning Research 11 (2010) 555-580. 26 pages.

Shervashidze, Nino, et al. "Fast subtree kernels on graphs." Advances in Neural Information Processing Systems, 1660-1668. 2009. 9 pages.

Shervashidze, Nino, et al. "Efficient graphlet kernels for large graph comparison." Artificial Intelligence and Statistics, 488-495. 2009. 8 pages.

Hervashidze, Nino, et al. "Weisfeiler-Lehman Graph Kernels." Journal of Machine Learning Research 12 (2011) 2539-2561. 23 pages.

Socher, Richard, et al. "Recursive Deep Models for Semantic Compositionality Over a Sentiment Treebank." Proceedings of the 2013 Conference on Empirical Methods in Natural Language Processing, 1631-1642. 12 pages.

* cited by examiner

ENCODING AND DECODING TREE DATA STRUCTURES AS VECTOR DATA STRUCTURES

BACKGROUND

The subject disclosure relates to data structures used by computer programs, and more specifically, to tree data structures and vectors.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate encoding and decoding tree data structures as vectors are described.

According to an embodiment, a system can comprise a memory that stores computer executable components, and a processor that executes the computer executable components stored in the memory. The computer executable components can comprise a constraint former that can form a set of constraints based on a first tree data structure, and a vector encoder that can encode the first tree data structure into a vector based on the set of constraints.

According to another embodiment, a computer-implemented method can comprise forming, by a system operatively coupled to a processor, a set of constraints based on a first tree data structure, and encoding, by the system, the first tree data structure into a vector based on the set of constraints.

According to another embodiment, a computer program product that can facilitate encoding a tree data structure into a vector based on a set of constraints is provided. The computer program product can comprise a computer readable storage medium having program instructions embodied therewith, the program instructions can be executable by a processor to cause the processor to form the set of constraints based on the tree data structure, and encode, by the processor, the first tree data structure into the vector based on the set of constraints.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Generally speaking, one or more embodiments described herein can encode a set of tree data structures into a satisfiability problem that can be stored in a vector. Encoded as a vector, the tree data structures can be more easily used by some computer systems that cannot use tree data structures as input. In one or more embodiments, to decode the vector, the satisfiability problem stored in the vector can be solved, with a set of solutions having at least the input set of tree data structures.

One or more approaches described herein can facilitate characterization of tree data structures as constraints based on first-principles, e.g., not requiring training data. In addition, in one or more embodiments, representations can be constructed in a transparent way, e.g., the representations of feature vectors can be more easily determined.

Figure 1:
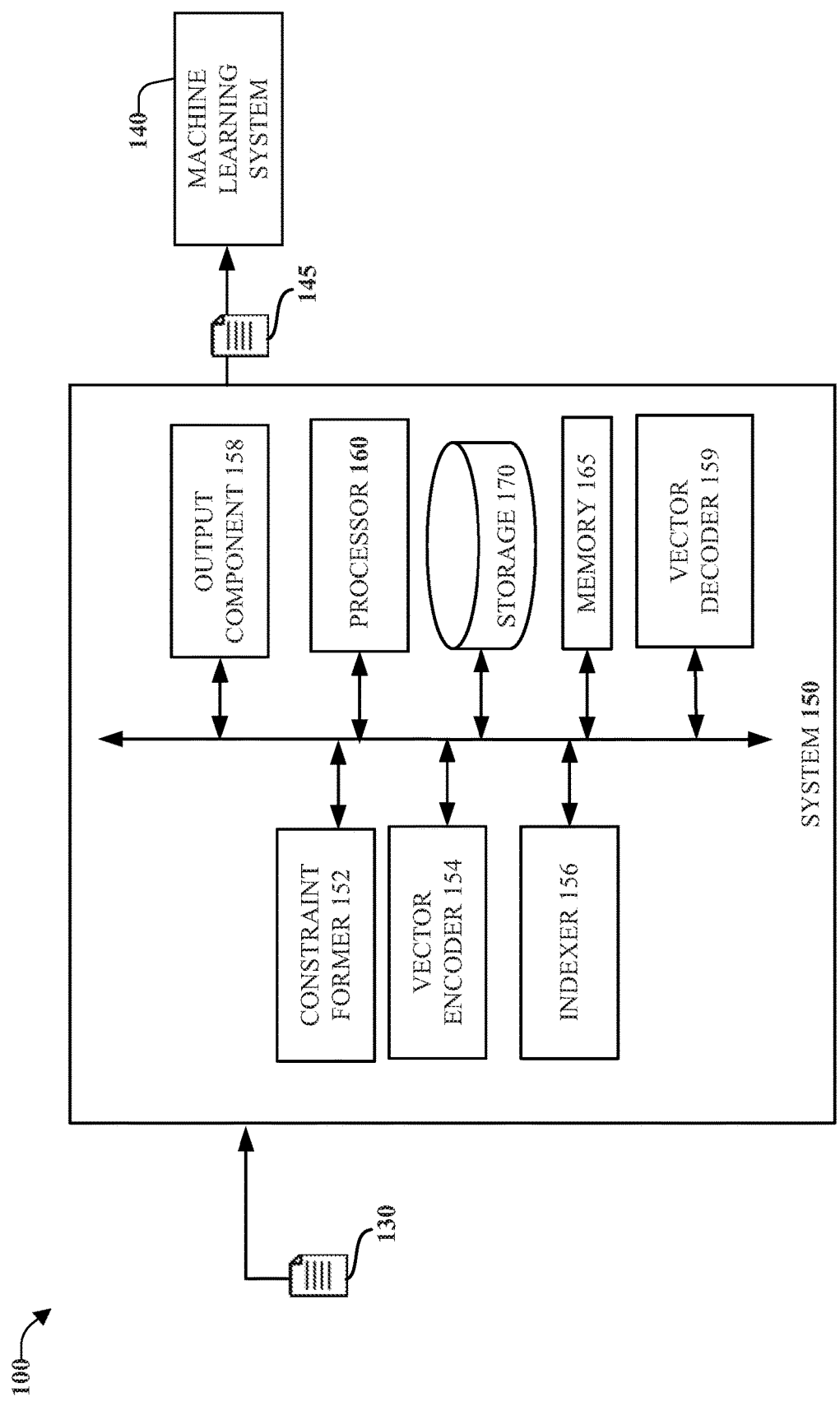
FIG. 1 illustrates a block diagram of an example, non-limiting system that can facilitate encoding a tree data structure into a vector based on a set of constraints in accordance with one or more embodiments described herein.

FIG. 1 illustrates a block diagram 100 of an example, non-limiting system 150 that can facilitate encoding a tree data structure 130 into a vector 145 based on a set of constraints in accordance with one or more embodiments described herein.

According to multiple embodiments, memory 165 can store one or more computer and/or machine readable, writable, and/or executable components and/or instructions that, when executed by processor 160, can facilitate performance of operations defined by the executable component(s) and/or instruction(s). For example, memory 165 can store computer and/or machine readable, writable, and/or executable components and/or instructions that, when executed by processor 160, can facilitate execution of the various functions described herein relating to system 150, including constraint former 152, vector encoder 154, indexer 156, output component 158, and vector decoder 159. As described with FIGS. 2-9 below, system 150 can encode tree data structure 130 into vector 145 that can be used by other systems, including for example, machine learning system 140.

An example application that could use tree data structure data encoded as vector data is a machine translation system. Using one or more embodiments, implementation of a machine translation system does not require a sequence model, and instead maps inputs and outputs to a single vector generated by one or more embodiments described herein. This type of system could operate using a high-performance vector that is loaded using translation information from tree data structures.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1016 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1014 and FIG. 10. Such examples of processor 160 can be employed to implement any embodiments of the subject disclosure.

In one or more embodiments, tree data structure 130 can be an ordered tree data structure, e.g., an abstract data type that can simulate a hierarchical tree structure, with a root value node linked to one or more subtrees of descendant nodes. In other embodiments, other data structures, including other types of tree data structures can also be used. Vector 145 can be a real-valued vector of a fixed size configured to be used by machine learning system 140, in accordance with one or more embodiments. In other embodiments, other types of vectors, including types without fixed sizes can also be used. In one or more embodiments, tree data structure 130 can be a part of a neural network, e.g., a long short-term memory neural network that can capture structural information in natural language. As such, one or more embodiments can be a part of a process that combines structured information inherent in naturally occurring data (e.g., predicate-argument structures in natural language and hierarchical spatial information in images) with robust machine learning methods. In other embodiments, tree data structures can be a part of different types of neural networks.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
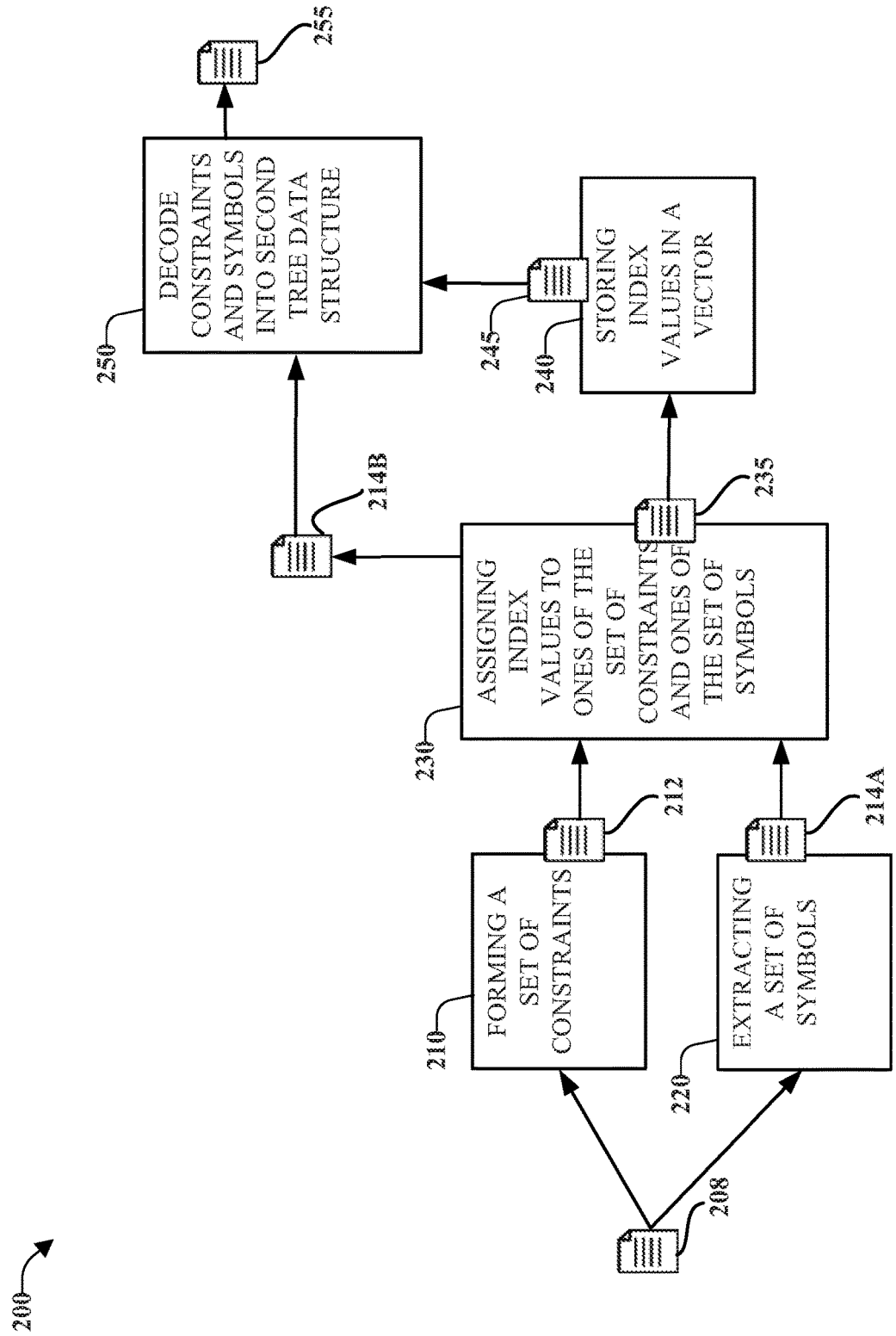
FIG. 2 illustrates a process diagram of an example, non-limiting system that can facilitate encoding a tree data structure into a vector based on a set of constraints in accordance with one or more embodiments described herein.

FIG. 2 illustrates a process diagram of an example, non-limiting system 200 that can facilitate encoding a first tree data structure 208 into vector 245, and decoding vector 245 back into second tree data structure 255, in accordance with one or more embodiments described herein. Repetitive description of like elements and/or processes employed in other embodiments described herein is omitted for sake of brevity.

First tree data structure 208 can be encoded into vector 245 by processes 210, 220, 230, and 240 discussed below. In one or more embodiments, a process 210 can form a set of constraints 212 to represent first tree data structure 208 as a satisfiability problem. Different approaches to forming constraints 212 are discussed in detail below with the discussion of FIG. 4.

In one or more embodiments, a process 220 can extract a set of symbols 214A that are comprised in first tree data structure 208. As discussed in detail with FIG. 3 below, these symbols 214A can comprise functions and predicates of first tree data structure 208 and can be combined with constraints 212 as a part of a satisfiability problem.

In one or more embodiments, a process 230 can assign index values to ones of the set of constraints 212 and ones of the set of symbols 214A. This assignment of index values is one way of combining and using constraints 212 and symbols 214A, and other ways of combining can be used by embodiments without departing from the spirit and scope of approaches described herein. In one or more embodiments, after indexing, symbols 214A can be stored for use as stored symbols 214B.

In one or more embodiments, a process 240 can encode constraints 212 and index values 235 into vector 245. As described in detail with FIG. 5, assigned index values 235 can be used by one or more embodiments to store references to constraints 212 and symbols 214B in vector 245.

In one or more embodiments, a process 250 can use vector 245 to solve a satisfiability problem using constraints 212 encoded in vector 245 and stored symbols 214B. As described in detail with FIG. 6 below, the result of this satisfiability problem can result in second tree data structure 255.

Figure 3:
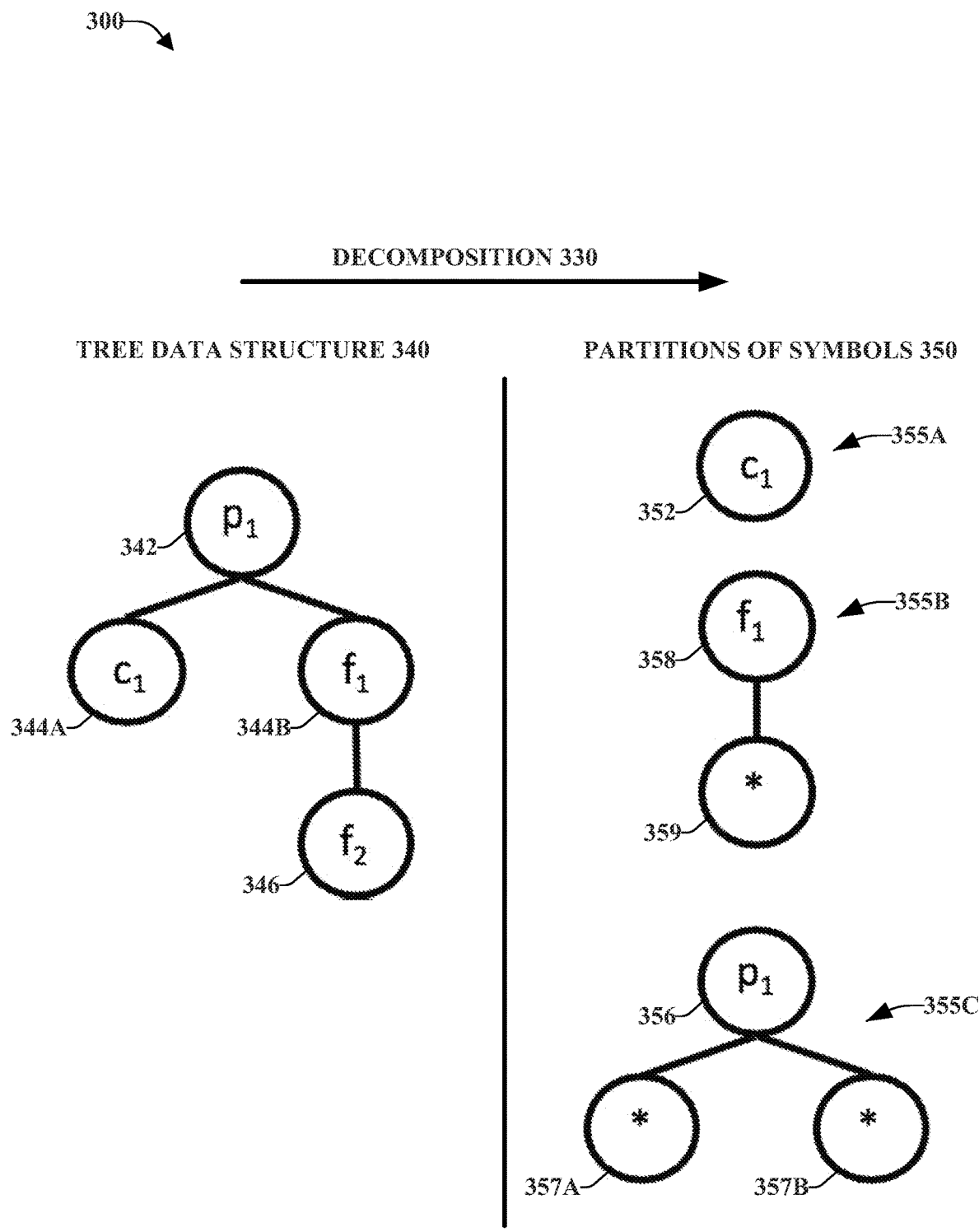
FIG. 3 illustrates partitions of symbols of a tree data structure in accordance with one or more embodiments described herein.

FIG. 3 illustrates partitions of symbols 350 of a tree data structure 340 in accordance with one or more embodiments described herein. Example tree data structure 340 includes a root node $P^1$ 342 linked to descendant nodes $C_1$ 344A and $F_1$ 344B, descendant node $F_1$ 344B being further linked to descendant node $F_2$ 346. Repetitive description of like elements and/or processes employed in other embodiments described herein is omitted for sake of brevity.

In one or more embodiments, the process of encoding tree data structure 340 into vector 245 can include a decomposition 330 of the symbols of tree data structure 340. Decomposition 330 can include identifying individual nodes, along with a number of descendant nodes for each node, then partitioning these nodes into partitions 355A-C. For example, root node $P_1$ 342 corresponds to partition 355C with symbol 356 and two descendant nodes 357A-B. Descendant node $F_1$ 344B corresponds to partition 355B with symbol 358 and one descendant node 359. Descendant node $C_1$ 344A corresponds to partition 355A with symbol 352, and a partition for descendant node $F_2$ 346 is omitted for sake of brevity.

In an example partition of symbols of tree data structure 340, a signature $\Sigma = (\Pi, \Omega)$ gives all the non-logical symbols of a formal language, a set of predicates of the symbols is denoted by $\Pi$ and a set of functions of the symbols is denoted by $\Omega$, where constants and propositional variables are defined to be functions and predicates of arity zero. The set H is the set of all terms that can be formed from $\Omega$, and in this example, H can be constructed recursively as follows:

$H^0$ can either be the set of all constants or a singleton set(a) that can be used to ensure that H is non-empty $L^i = \{(f^n(t_1, \ldots, t_n) | \forall t_1, \ldots, t_n \in H^{i-1}, \forall f^n \in \Omega\}$ $H^i = H^{i-1} \cup L^i$ $H = H^\infty$ In this example, from the constructed set H, a base, B, can be defined as the set of all atoms that can be formed by applying every predicate to every combination of terms from H, e.g., $B = \{p^m(t_1, \ldots, t_m) | \forall t_1, \ldots, t_m \in H, \forall p^m \in \Pi\}$ In one or more embodiments, this set of all possible grounded expressions (B) can provide an underlying domain for approaches described herein. In an example, when at least one function and predicate have arity >0, both H and B can be infinite, with expressions that are infinitely deep and nested.

In accordance with one or more embodiments, based on the operations above, the tree data structure is represented by elements from B, e.g., the root nodes of the tree data structure are predicates, internal nodes are functions of arity >0, and leaf nodes are constants. One or more embodiments maintain a distinction between predicates and functions, because, as discussed with FIG. 6 below, some approaches to reconstruction of a tree data structure from a vector handle predicates and functions differently.

Once tree data structure 340 has been decomposed into partitions of symbols 350, the partitions can be indexed with the constraints, as discussed with FIG. 5 below.

Figure 4:
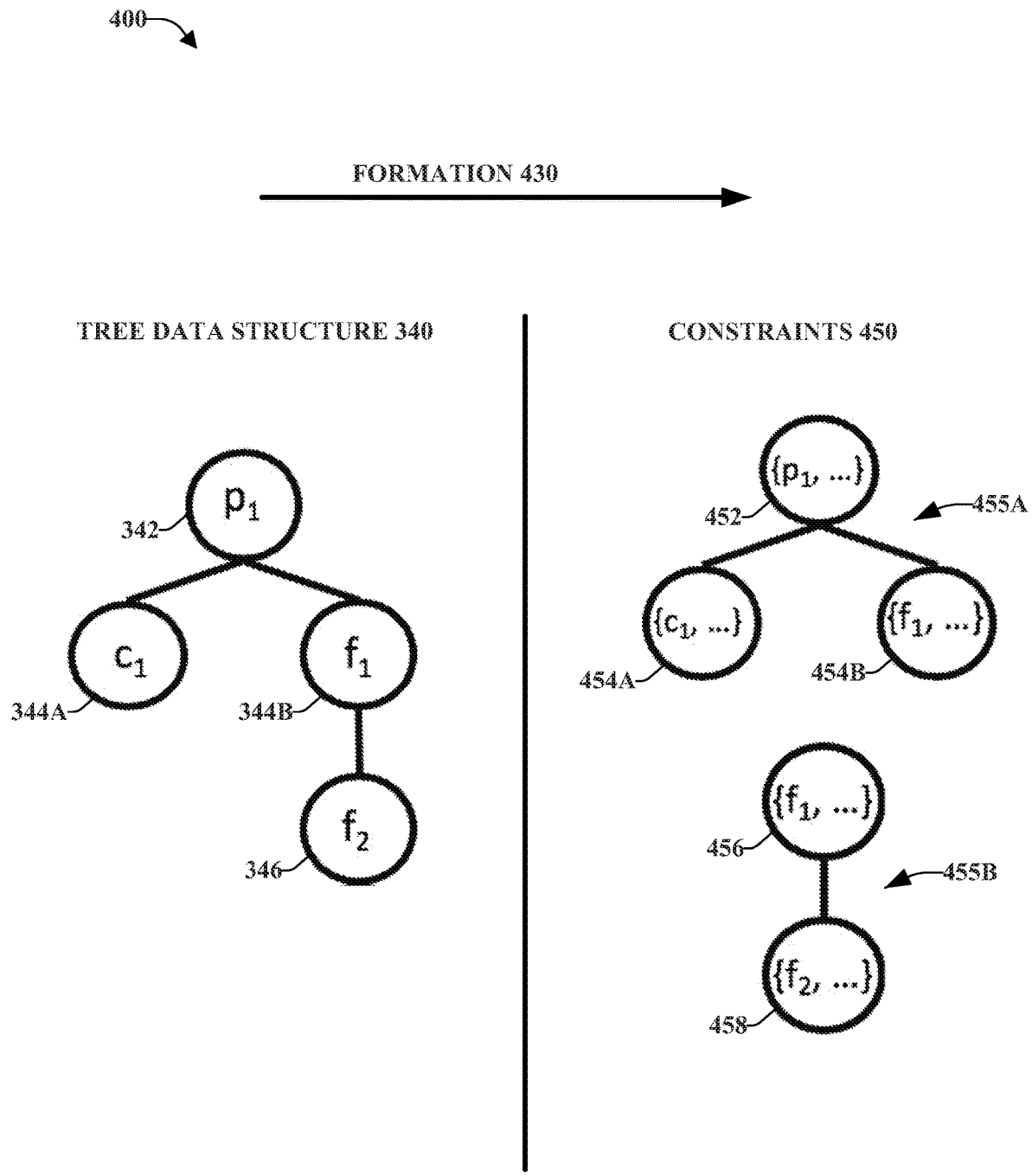
FIG. 4 illustrates a formation of constraints based on a tree data structure in accordance with one or more embodiments described herein.

FIG. 4 illustrates a formation 430 of constraints 450 for a satisfiability problem based on tree data structure 340 of FIG. 3, in accordance with one or more embodiments described herein. Repetitive description of like elements and/or processes employed in other embodiments described herein is omitted for sake of brevity.

In one or more embodiments, constraints can be formed for partitions of tree data structure 340 that have symbols that are linked to descendant nodes, e.g., partition 355C having root node $P_1$ 342 linked to descendant nodes $C_1$ 344A and $F_1$ 344B, and partition 355B having descendant node $F_1$ 344B linked to descendant node $F_2$ 346. In an example constraint generated by one or more embodiments, for each of a number of descendant nodes linked to by a node, a descendant node can be a particular symbol, e.g., for constraint 455A, node 452, which can be root node $P_1$ 342, is linked to two descendant nodes, a first descendant node 454A can be descendant node $C_1$ 344A, and a second descendant node 454B can be descendant node $F_1$ 344B. Constraint 455B can be similarly formed with node 456 and descendant node 458.

It should be noted that the constraints described above, used by one or more embodiments, only specify that the original nodes of tree data structure 340 be included in a set of possible nodes, e.g., descendant node 454A can be, but is not limited to, descendant node $C_1$ 344A. This level of restriction in formed constraints is only one level used by one or more embodiments. By having constraints of a more restrictive level, vectors produced can encode the original tree data structure with varying levels of accuracy, e.g., from an exact reconstruction to other lower levels of accuracy. In one or more embodiments, reconstruction accuracy can be reduced or increased to produce vectors having different characteristics, e.g., reduced accuracy can produce more compact vectors in some embodiments, e.g., by using hyperparameters as discussed below. Example applications where reconstruction fidelity of tree data structure 340 can be less important include premise selection or clause selection in automated theorem proving. In other implementations, increased accuracy can produce larger vectors.

To illustrate concepts discussed herein, a detailed example of an approach to forming constraints that can be used by one or more embodiments is provided below. As noted above, the formed set of constraints can encode sets of tree data structures as satisfiability problems. In this example, given a set of elements of a tree data structure (T) drawn from the Herbrand base (e.g., $T \subset B$), a satisfiability problem can be constructed that has a set of solutions, which at least includes T. In addition, in one or more embodiments, hyperparameters can be tuned to produce more restrictive constraint problems that can yield fewer solutions (at the cost of space), thus allowing for a trade-off between compactness and discriminability.

One approach to forming constraints used by one or more embodiments is described below and uses: a set of symbols (S), and a set of constraints (C), a signature $\Sigma = (\Pi, \Omega)$, and, for any set of elements, $S = \Pi \cup \Omega$. C can be constructed with all functions (F) and predicates (C) being divided into sets based on arity, e.g.:

$P = \{P_0, \ldots, P_m\}, P_i = \{p | \text{arity}(p) i, p \in \Pi\}$ $F = \{F_0, \ldots, F_m\}, F_i = \{f | \text{arity}(f) = i, f \in \Omega\}$ In this example, a function split (w, M) can be defined that takes as an input a width $w \in \mathbb{N}$ and a set M, and based on this input randomly partitions M into w disjoint sets. Using split, a base to the formed constraints can be generated as follows:

$\overline{P} = \cup_{i=0}^m \text{split}(w, P_i)$ $\overline{F} = \cup_{i=0}^n \text{split}(w, F_i)$ A function $\gamma$ can be defined that takes as an input a seed set of predicates or functions and returns a new random partition, e.g., a new set of:

$\overline{F} = \cup_{i=0}^n \text{split}(w, F_i)$

In this example, from $\overline{P}$, $\overline{F}$, and each call to $\gamma$ (all of which are sets of sets), the set of all constraints (C) can be defined as:

$$C_P = \bigcup_{p^k \in \overline{P}} \{p^k(F_1, \ldots, F_k) \mid \forall F_1, \ldots, F_k \in \gamma(P^k)\}$$

-continued $$C_F = \bigcup_{F^k \in F} \{F^k(F_1, \ldots, F_k) \mid \forall\, F_1, \ldots, F_k \in \gamma(F^k)\}$$

$$C = C_P \cup C_F$$

In this example, each element of C can be a pattern that ground expressions can be matched against. For example, matchability between a pattern $P^k(F_1, \ldots, F_k)$ and some expression $p(f_1(\ldots), \ldots, f_k)$ can be defined with the lead elements matching, and each immediate argument matching, e.g.: $p \in p^k$ and $f_i \in F_i$, $\forall_i \in [k]$, respectively. The same definition can also hold for expressions that begin with functions.

It should be noted that the definition of matchability as presented above considers the lead predicate or functor and the functors of its immediate arguments. Whether or not an immediate argument has arguments itself has no bearing, in this example, on whether it will match to some pattern. Other embodiments can use different approaches. Constraints of the form $P^k(F_1, \ldots, F_k)$ are referred to by one or more embodiments as predicate constraints and constraints of the form $F^k(F_1, \ldots, F_k)$ are referred to as function constraints.

In this example, with S and C defined, one or more embodiments can decompose an expression E into a multi-set of symbols $\overline{S}$ and constraints $\overline{C}$ as follows:

$\overline{S}$=every symbol in $E$ $\overline{C}$=every constraint that matches a subexpression of $E$ Because, in this example, the disjointness constraint can be enforced by the function split, subexpressions of E can match to exactly one element of C. One or more embodiments can vary the approach described above by designing different satisfiability problems for different types of data structures, e.g. unordered tree data structures and directed-acyclic graphs. In addition, one or more embodiments can form constraints that encode longer-range dependencies, e.g., descendant nodes of descendant nodes of a function. One or more embodiments can also form constraints that encode ancestor dependency constraints, e.g., ancestor nodes of a function, and ancestor nodes of ancestor nodes of a function. Adding these additional types of constraint can, in one or more embodiments, affect the balance between accuracy and performance discussed above.

Figure 5:
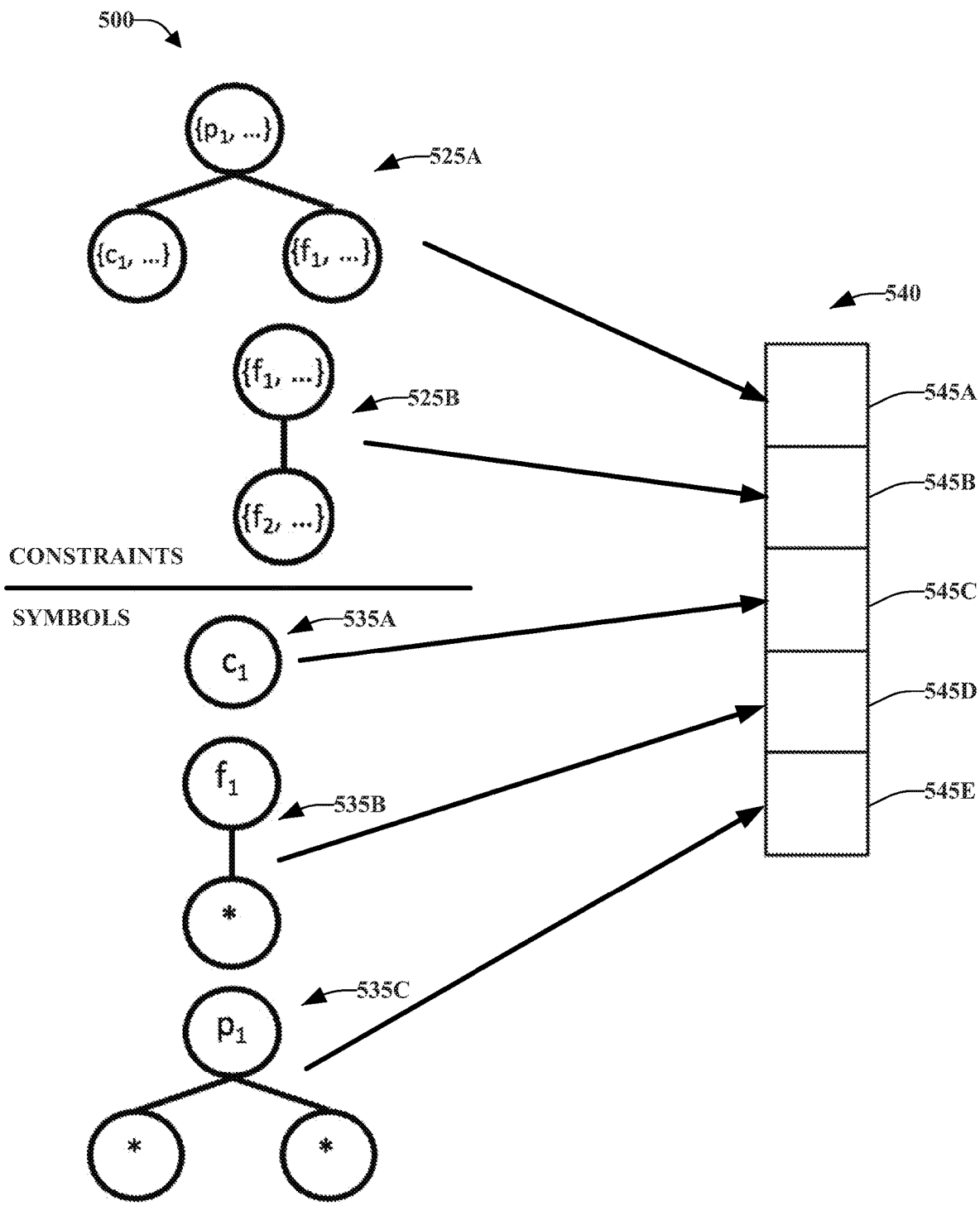
FIG. 5 illustrates a vector having elements corresponding to the decomposed elements and formed constraints of FIGS. 3 and 4 in accordance with one or more embodiments described herein.

FIG. 5 illustrates a vector 540 having elements 545A-E corresponding to the partitioned elements and formed constraints of FIGS. 3 and 4, in accordance with one or more embodiments described herein. Repetitive description of like elements and/or processes employed in other embodiments described herein is omitted for sake of brevity.

In one or more embodiments, as discussed in FIG. 2 above, partitioned symbols 525A-B and constraints 535A-C can be indexed, with the index references stored in vector elements 545A-E as illustrated in FIG. 5.

Returning to the example discussed above, a vector representation (V) can be constructed for T as follows: Assign every symbol and constraint an index in a vector of size |S|+|C|. In this example, to convert an expression E into a feature vector, add the number of times a particular symbol in $\overline{S}$ and constraint in $\overline{C}$ occurs to the appropriate index of V.

Figure 6:
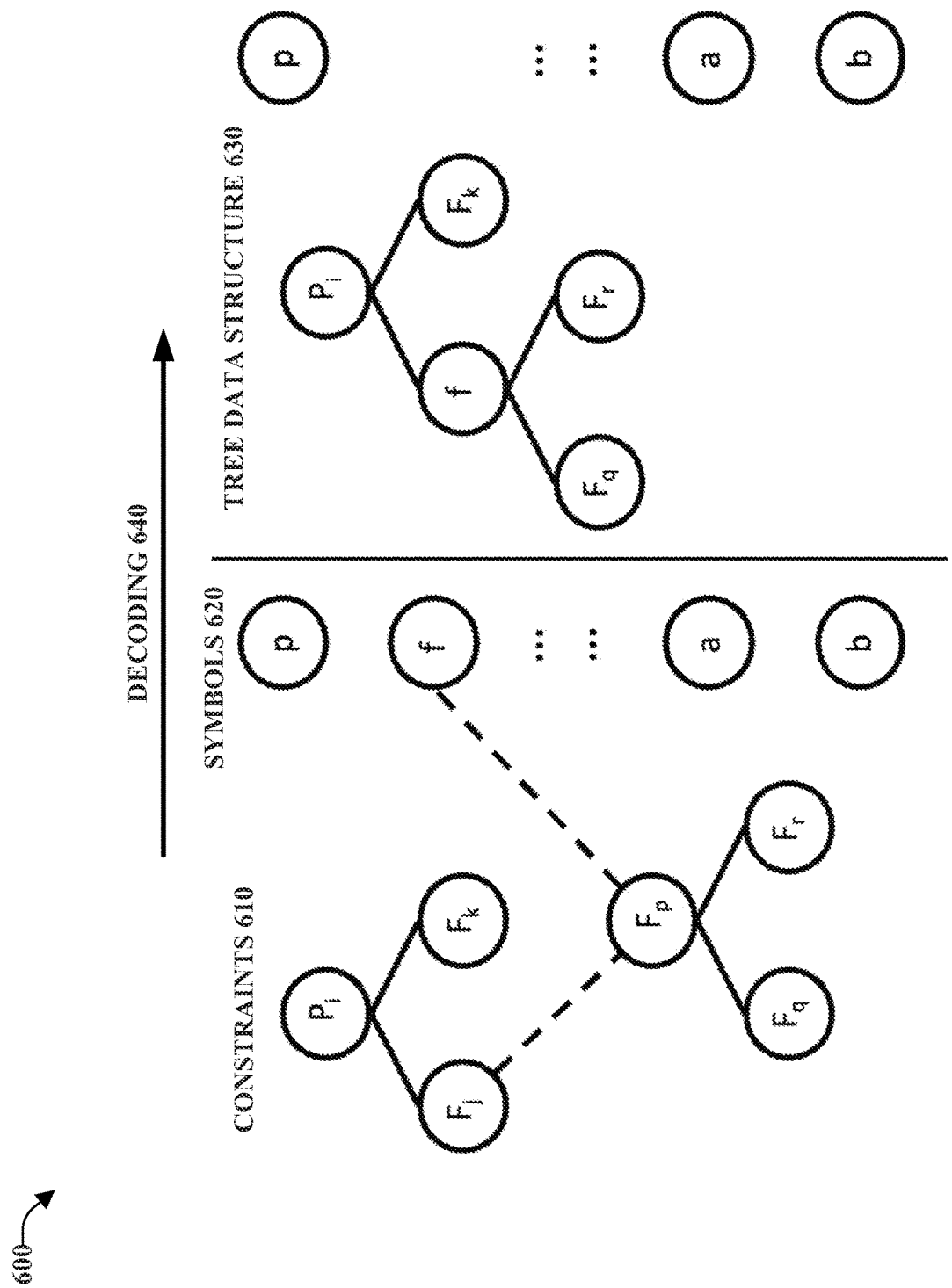
FIG. 6 illustrates a top view of a block diagram of an example, non-limiting system that can facilitate decoding a vector into a tree data structure in accordance with one or more embodiments described herein.

FIG. 6 illustrates a top view of a block diagram of an example, non-limiting system that can facilitate decoding 640 a vector of constraints 610 and symbols 620 into a tree data structure 630 in accordance with one or more embodiments described herein. Repetitive description of like elements and/or processes employed in other embodiments described herein is omitted for sake of brevity.

To illustrate the decoding process used by one or more embodiments, a discussion of the example above is discussed below. From vector V, constructed as described above, a multi-set of symbols $\overline{S}$ and multi-set of constraints $\overline{C}$ are extracted, where the number of times a symbol or constraint appears in respective multi-sets is its value at its associated index in V. In this example, the following multi-sets are defined from $\overline{S}$:

$P_s \subset \overline{S}$, the multiset of all predicates
$F_s \subset \overline{S}$, the multiset of all functions with arity >0
$C_s \subset \overline{S}$, the multiset of all constants Similarly, the multi-set of constraints $\overline{C}$ is split, with each element the set of constraints $\overline{C}$ beginning with either a set of predicates (e.g., $P^k$ in $P^k(F_1, \ldots, F_k)$) or a set of functions (e.g., $F^k$ in $F^k(F_1, \ldots, F_k)$):

$P_{\overline{C}}$, the multi-set of all lead predicate sets (e.g., $P^k$)
$F_{\overline{C}}$, the multi-set of all lead function sets (e.g., $F^k$)
$A_C$, the multi-set of all arguments that are constant sets
$A_F$, the multi-set of all arguments that are function sets A set of propositional variables $\Gamma$ can be created as follows:

$$\Gamma_p = \{p_{ij} \mid \forall i,j : P_s[i] \in P_{\overline{C}}[j]\}$$

$$\Gamma_c = \{c_{ij} \mid \forall_{ij} : C_s[i] \in A_C[j]\}$$

$$\Gamma_f = \{f_{ijk} \mid \forall_{i,j,k} : F_s[i] \in F_{\overline{C}}[j] \cap A_F[k]\}$$

$$\Gamma = \Gamma_p \cup \Gamma_c \cup \Gamma_f$$

In this example, the variables in $\Gamma_p$ and $\Gamma_c$ can indicate that the predicate or constant set (e.g., $P_{\overline{C}}[j]$ or $A_c[j]$) of a constraint is swapped out for a particular predicate or constant $P_s[i]$ or $C_s[i]$. $\Gamma_p$ can similarly indicate that such a substitution should occur, but, in addition, represents a join operation between two constraints. In this example, a join operation is a type of reification, where the lead functor of some constraint in C is said to be the same object as the argument in another pattern of C. FIG. 6 illustrates an example of this reification, where, if constraints 610 and symbols 620 are $\Gamma_f$, tree data structure 630 can be a result of the reification that can occur is $\Gamma_g$ is determined to be true.

From $\Gamma$, components of a satisfiability problem can be defined in this example as follows:

1. A one-to-one correspondence between predicates in $P_S$ and predicate sets in $P_{\overline{C}}$ $$P_i \wedge_j (\oplus_i p_{ij})$$

$$P_r \wedge_i (\oplus_j p_{ij})$$

2. A one-to-one correspondence between constants in $C_S$ and constant sets in $A_C$ $$C_i = \wedge_j (\oplus_i c_{ij})$$

$$C_r = \wedge_i (\oplus_j c_{ij})$$

3. A one-to-one-to-one correspondence between functions in $F_S$, function sets in and function sets in $F_{\overline{C}}$, and function sets in $A_F$ $$F_i \wedge_{j,k} (\oplus_i f_{ijk})$$

$$F_m 32\ \wedge_{i,k} (\oplus_j f_{ijk})$$

$$F_r = \wedge_{i,j} (\oplus_k f_{ijk})$$

As described above, in this example, a satisfiability problem can be generated that has a set of solutions that at least includes the original tree data structure. In other embodiments, to enable creation of more constrained satisfiability problems additional constraints can be added. For example, t parallel set of constraints $\{\overline{C}_1, \ldots, \overline{C}_t\}$ can be added, each of which can be partitioned as before into $P_{\overline{C}_i}$, $F_{C_i}$, $A_{C_i}$, and $A_{F_i}$. Each $\overline{C}_i$ can be generated with the process outlined above, but $\overline{C}_i$ can have different partitions due to the randomness of the split function. With additional constraints added, in an example, $\Gamma$ can be extended to be:

$\Gamma_p = \{p_{ij_1} \ldots j_t | \forall i, j_1, \ldots, j_t : P_S[i] \in \cap_{s=1}^{t} P_{\overline{C}_S}[j_s]\}$ $\Gamma_c = \{C_{ij_1} \ldots j_1 \ldots j_t : C_S[i] \in \cap_{s=1}^{t} A_{C_s}[j_s]\}$ $\Gamma_f = \{f_{ij_1 k_1} \ldots | \forall_{i,j_1 k_1}, \ldots : F_S[i] \in \Omega_{s=1}^{t} F_{\overline{C}_i}[j_s] \cap S_{F_s}[k_s]\}$ $\Gamma = \Gamma_p \cup \Gamma_c \cup \Gamma_f$ Thus, based on the above, in this example, each propositional variable specifies a t-way match across all sets of constraints. Continuing the example, let π be a function that takes in an element of some constraint set and returns all variables from $\Gamma$ using that element, e.g.:

$\pi(P_{\overline{C}_2}[k]) = \{p_{ij_1 kj_3 \ldots j_t} \mid \forall\, i, j_1, j_3, \ldots, j_t : p_{ij_1 kj_3 \ldots j_t} \in \Gamma\}$ Based on the determined $\Gamma$ and π as discussed above, in this example, a new set of constraints can be constructed that maintain the exclusive-match policy described below:

1. Every predicate and every predicate set constraint is a part of one match $P_l = \bigwedge_{i=1}^{|P_S|} \left( \bigoplus_{p \in \pi(P_S[i])} p \right)$ $P_r = \bigwedge_{i=1}^{t} \left( \bigwedge_{j=1}^{|P_{\overline{C}_i}|} \left( \bigoplus_{p \in \pi(P_{\overline{C}_i}[j])} p \right) \right)$ 2. Every constant and every constant set constraint is a part of one match $C_l = \bigwedge_{i=1}^{|C_S|} \left( \bigoplus_{c \in \pi(C_S[i])} c \right)$ $C_r = \bigwedge_{i=1}^{t} \left( \bigwedge_{j=1}^{|A_{C_i}|} \left( \bigoplus_{c \in \pi(A_{C_i}[j])} c \right) \right)$ 3. Every function, every lead function set constraint, and every argument function set constraint is a part of one match $F_l = \bigwedge_{i=1}^{|F_S|} \left( \bigoplus_{f \in \pi(F_S[i])} f \right)$ $F_m = \bigwedge_{i=1}^{t} \left( \bigwedge_{j=1}^{|F_{\overline{C}_i}|} \left( \bigoplus_{f \in \pi(F_{\overline{C}_i}[j])} f \right) \right)$ $F_r = \bigwedge_{i=1}^{t} \left( \bigwedge_{j=1}^{|A_{F_i}|} \left( \bigoplus_{f \in \pi(A_{F_i}[j])} f \right) \right)$ By using multiple sets of constraints as described above, one or more embodiments can use parallel connectivity. One example of parallel connectivity that can be used by one or more embodiments is a type of constraint imposed on ancestor nodes when their descendant nodes are matched together. This type of constraint can specify that, if a set of functions or constants across all t partitions match together, then their ancestor nodes must match together as well.

Figure 7:
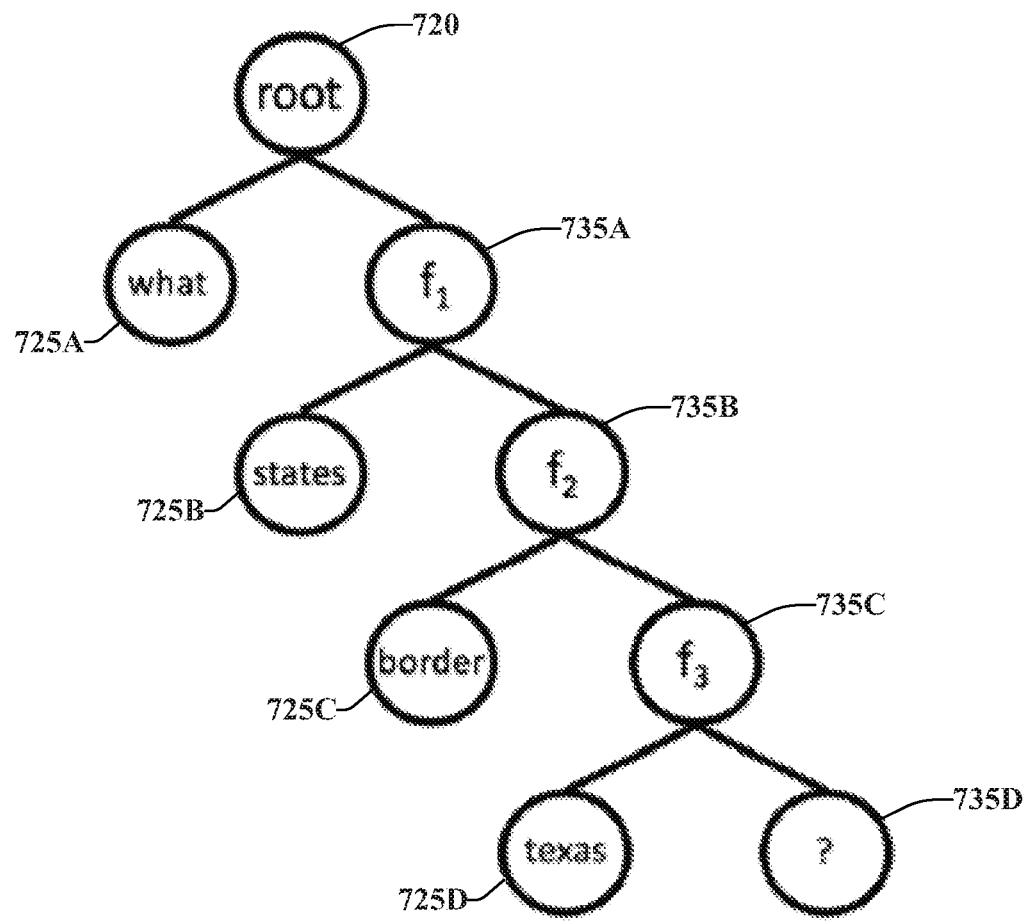
FIG. 7 illustrates an example of natural language processing using a vector encoded using approaches in accordance with one or more embodiments described herein.

FIG. 7 illustrates an example 700 of natural language processing using a vector encoded using approaches in accordance with one or more embodiments described herein. Repetitive description of like elements and/or processes employed in respective embodiments is omitted for sake of brevity.

In one or more embodiments, natural language sentences can be expressed as ordered binary trees, e.g., with V being the set of all words in a target corpus, and 1 being the maximum permitted sentence length, then $\Omega$, as described above, can be defined as $\Omega = V \cup \{f_i | 1 \leq i \leq l\}$. In this example, only one binary predicate is needed, this being the one used to indicate the beginning of a sentence "what states border texas," e.g., $\Pi = \{\text{root } 720\}$. With $S = \Pi \cup \Omega$, any sentence can be translated into a binary ordered tree with a given word 725A-D occurring at index i in the sentence is the descendant of functor $f_i$ 735A-D. In one or more embodiments, using approaches described herein to encode example 700 in the form of a vector, can enable a representation of sets of sentences for use in deep learning and automated reasoning tasks. In one implementation, example 700 can correspond to thirteen (13) vector entries, e.g., for each symbol 720, 725A-D and constraints based on symbols with descendant nodes 720, 735A-C.

Figure 8:
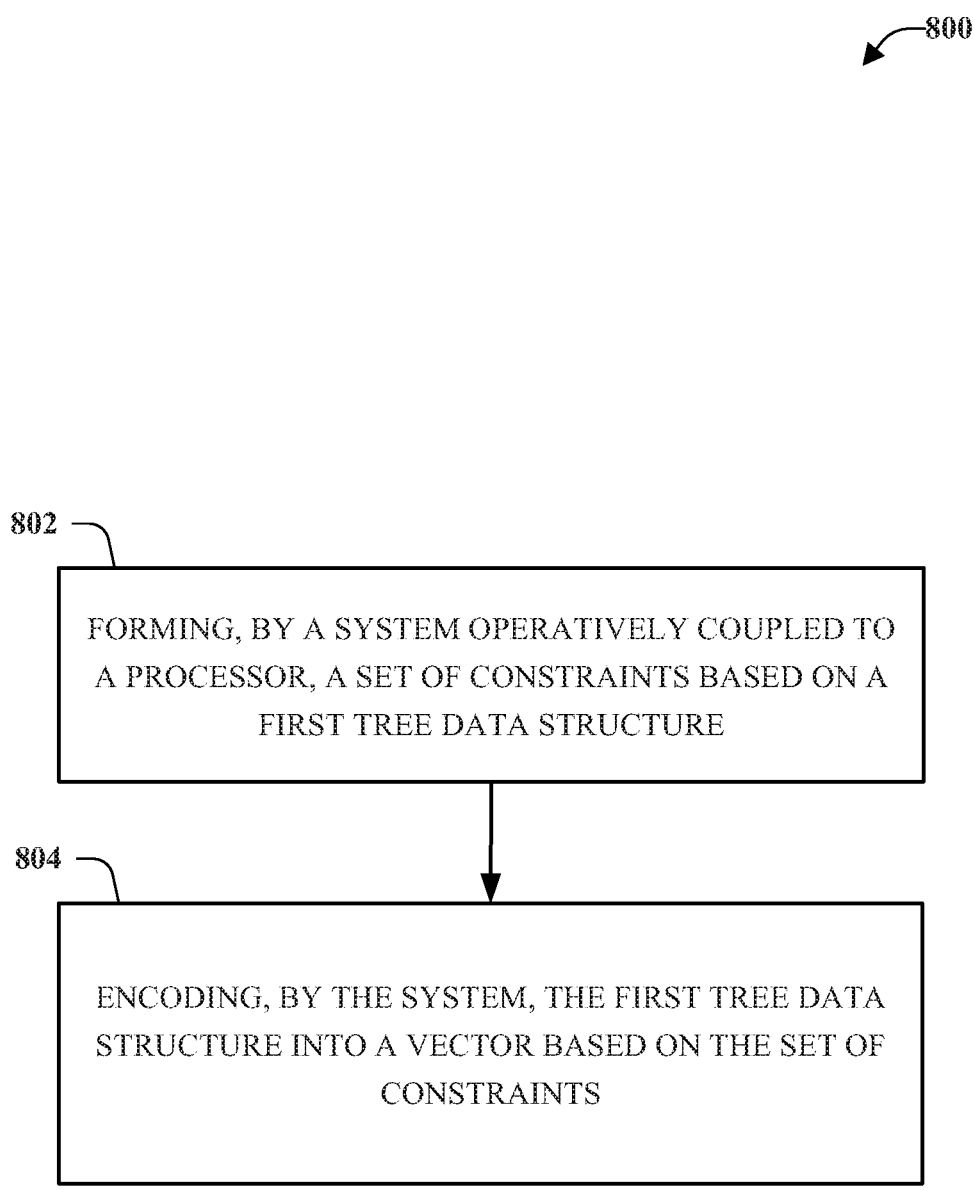
FIG. 8 illustrates a flow diagram of an example, non-limiting computer-implemented method that can facilitate encoding a tree data structure into a vector based on a set of constraints in accordance with one or more embodiments described herein.

FIG. 8 illustrates a flow diagram of an example, non-limiting computer-implemented method 800 that can facilitate encoding a tree data structure 130 into a vector 145 based on a set of constraints 212 in accordance with one or more embodiments described herein. Repetitive description of like elements and/or processes employed in respective embodiments is omitted for sake of brevity.

At 802, method 800 includes forming (e.g., using constraint former 152), by a system 150 operatively coupled to a processor 160, a set of constraints 212 based on a first tree data structure 130. Method 800 can form constraints 212 based on processes described with FIG. 4 above, e.g., by generating constraints 450 for symbols of tree data structure 340 that are linked to descendant nodes, e.g., root node $P_1$ 342.

At 804, method 800 includes encoding (e.g., using vector encoder 154), by the system 150, the first tree data structure 130 into a vector 145 based on the set of constraints 212. As described with FIG. 2 above, ones of constraints 212 can be indexed (e.g., using indexer 156) and the index values 235 can be stored (e.g., by process 240) in vector 145.

Figure 9:
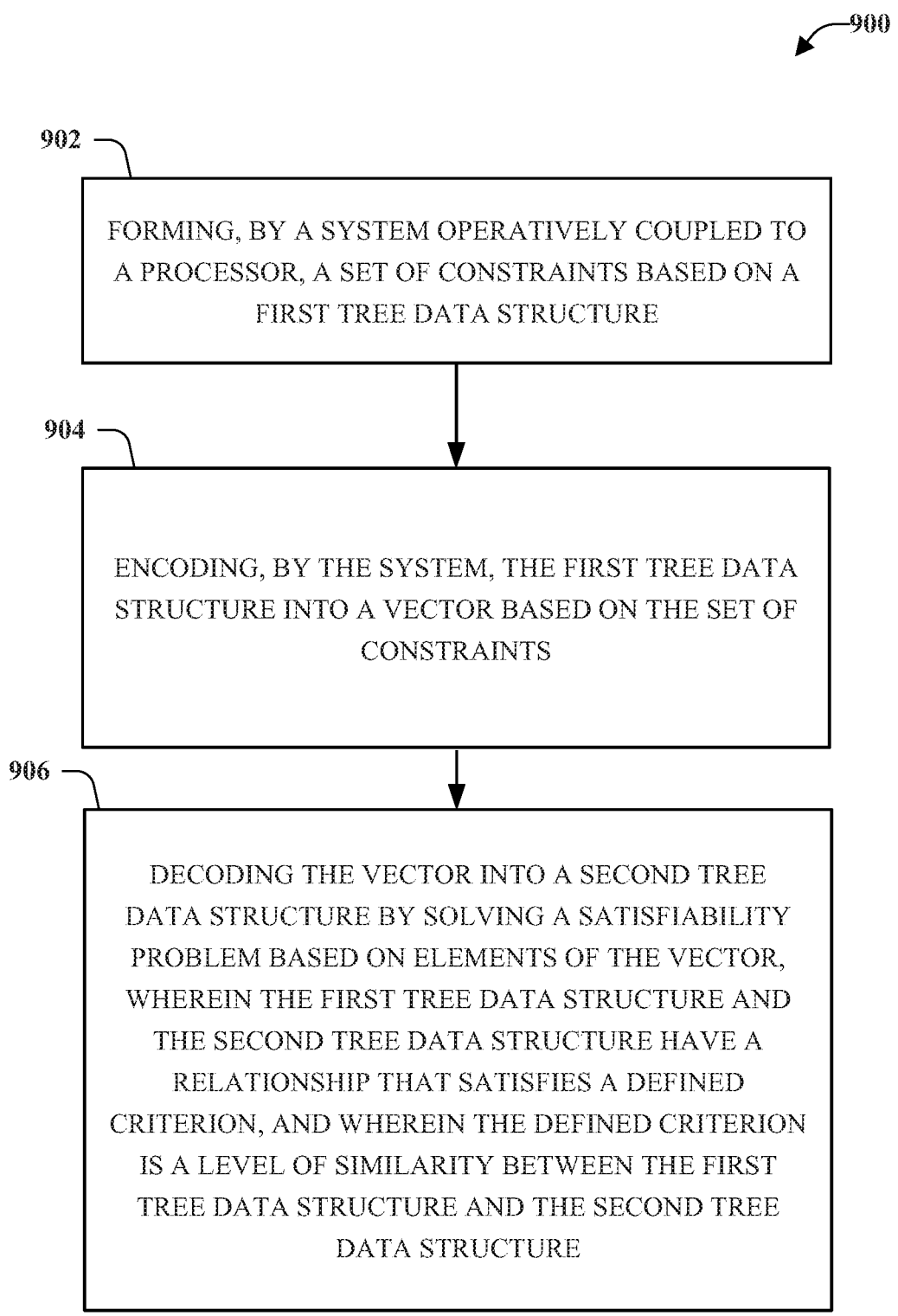
FIG. 9 illustrates a flow diagram of an example, non-limiting computer-implemented method that can facilitate encoding a tree data structure into a vector based on a set of constraints in accordance with one or more embodiments described herein.

FIG. 9 illustrates a flow diagram of an example, non-limiting computer-implemented method 900 that can facilitate encoding a tree data structure 130 into a vector 145 based on a set of constraints 212 in accordance with one or more embodiments described herein. Repetitive description of like elements and/or processes employed in respective embodiments is omitted for sake of brevity.

At 902, method 900 includes forming (e.g., using constraint former 152), by a system 150 operatively coupled to a processor 160, a set of constraints 212 based on a first tree data structure 130. At 904, method 900 includes encoding (e.g., using vector encoder 154), by the system 150, the first tree data structure 130 into a vector 145 based on the set of constraints.

At 906, method 900 includes decoding (e.g., using vector decoder 159) the vector 145 into a second tree data structure 255 by solving a satisfiability problem (e.g., discussed with FIG. 7) based on elements of the vector 145, wherein the first tree data structure 130 and the second tree data structure 255 have a relationship that satisfies a defined criterion, and wherein the defined criterion is a level of similarity between the first tree data structure and the second tree data structure, e.g., as discussed with FIGS. 4 and 7, decoded vectors can have a high level of similarity. In variations discussed herein, the level of similarity can vary based on a restrictiveness in the level of constraints implemented at the time of encoding.

Figure 10:
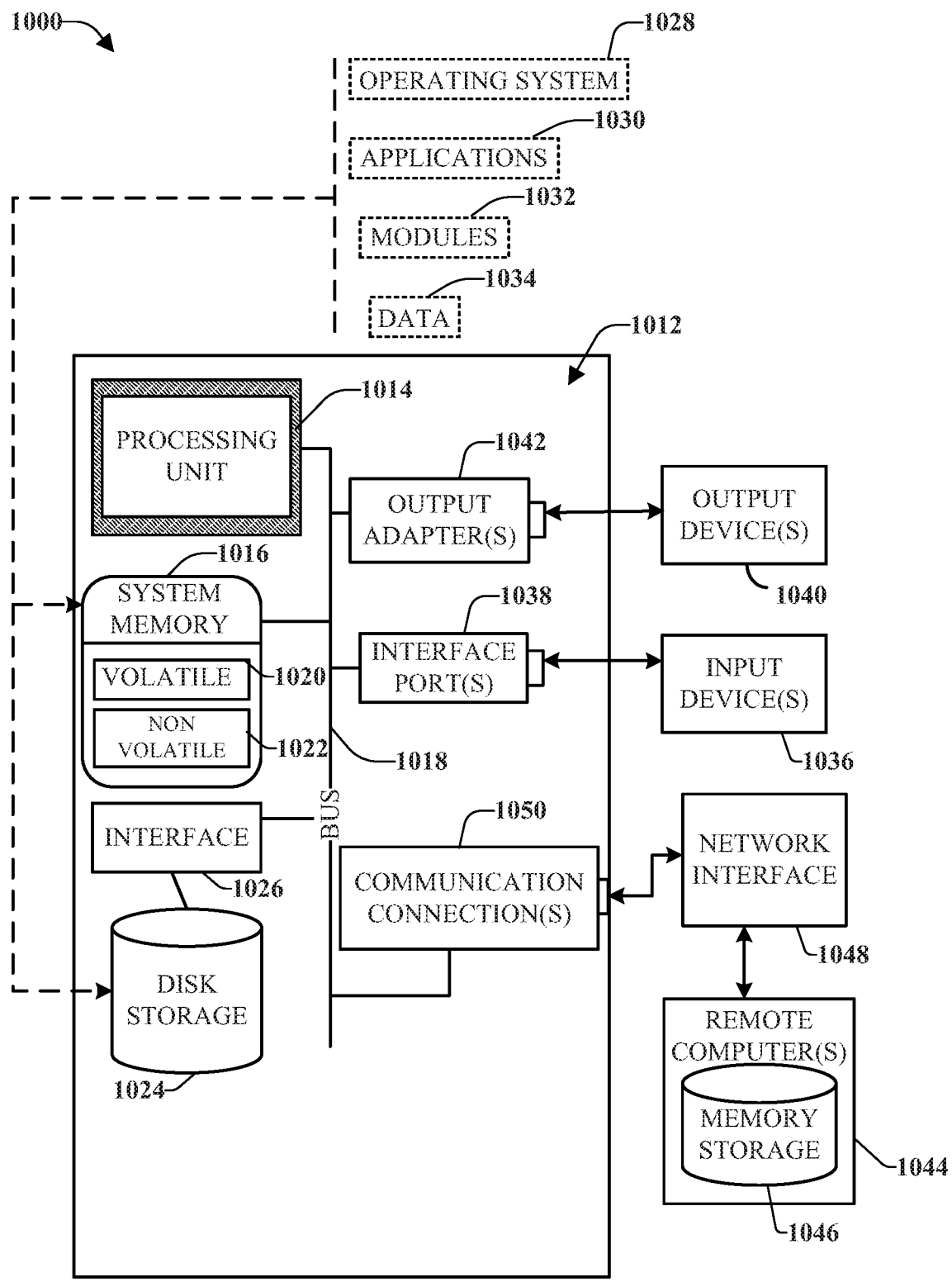
FIG. 10 illustrates a block diagram of an example, non-limiting operating environment in which one or more embodiments described herein can be facilitated.

With reference to FIG. 10, a suitable operating environment 1000 for implementing various aspects of this disclosure can also include a computer 1012. In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements and/or processes employed in other embodiments described herein is omitted for sake of brevity.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

The computer 1012 can include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer-implemented process, such that the instructions, which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and a processor that executes the computer executable components stored in the memory, wherein the computer executable components comprise:
a constraint former that forms a set of symbols based on a first tree data structure, and a set of constraints based on the first tree data structure and an intended level of accuracy of encoding, wherein the set of symbols comprises predicates representing root nodes of the first tree data structure, functions representing internal nodes of the first tree data structure and constants representing leaf nodes of the first tree data structure, and wherein the first tree data structure is part of a neural network; a vector encoder that encodes the first tree data structure into a vector based on the set of constraints;
an indexer that assigns index values to ones of the set of constraints and to ones of the set of symbols, wherein the vector encoder encodes the first tree data structure into the vector further based on the set of symbols and respectively assigned index values;
a vector decoder that decodes the vector into a second tree data structure by solving a satisfiability problem based on elements of the vector, wherein the satisfiability problem is generated based on a type of tree of the first data tree structure; and
an output component that employs the vector as an input for a machine learning system.

2. The system of claim 1, wherein the first tree data structure is an ordered tree data structure.

3. The system of claim 1, wherein the constraint former forms the set of constraints further based on the set of symbols.

4. The system of claim 3, wherein the constraint former forms the set of constraints based on partitions of the set of symbols.

5. The system of claim 4, wherein the partitions of the set of symbols are formed randomly.

6. The system of claim 1, wherein the index values reference elements of the vector.

7. The system of claim 1, wherein the first tree data structure and the second tree data structure have a relationship that satisfies a defined criterion.

8. The system of claim 7, wherein the defined criterion is a level of similarity between the first tree data structure and the second tree data structure.

9. A computer-implemented method, comprising:
forming, by a system operatively coupled to a processor, a set of symbols based on a first tree data structure and a set of constraints based on the first tree data structure and an intended level of accuracy of encoding, wherein the set of symbols comprises predicates representing root nodes of the first tree data structure, functions representing internal nodes of the first tree data structure and constants representing leaf nodes of the first tree data structure, and wherein the first tree data structure is part of a neural network;
encoding, by the system, the first tree data structure into a vector based on the set of constraints;
assigning, by the system, an index value to ones of the set of constraints and ones of the set of symbols, wherein the encoding the first tree data structure into the vector is further based on the set of symbols and respectively assigned index values;
decoding, by the system, the vector into a second data tree structure by solving a satisfiability problem based on elements of the vector, wherein the satisfiability problem is generated based on a type of tree of the first data tree structure; and
outputting, by the system, the vector to a machine learning system, wherein the machine learning system utilizes the vector as an input.

10. The computer-implemented method of claim 9, wherein the first tree data structure is an ordered tree data structure.

11. The computer-implemented method of claim 9, wherein the forming the set of constraints is further based on the set of symbols, and wherein the set of symbols comprise a set of predicates and functions of the first tree data structure.

12. The computer-implemented method of claim 11, wherein the index values reference elements of the vector.

13. The computer-implemented method of claim 11, wherein the forming the set of constraints is based on partitions of the set of symbols.

14. The computer-implemented method of claim 13, wherein the partitions of the set of symbols are formed randomly.

15. The computer-implemented method of claim 9, further comprising employing, by the system, the first tree data structure as an input for a machine learning system based on the vector.

16. The computer-implemented method of claim 9, wherein the first tree data structure and the second tree data structure have a relationship that satisfies a defined criterion, and wherein the defined criterion is a level of similarity between the first tree data structure and the second tree data structure.

17. A computer program product facilitating encoding a first tree data structure into a vector based on a set of constraints, the computer program product comprising a computer readable storage medium having program instructions embodied therewith, the program instructions executable by a processor to cause the processor to:

form, by the processor, a set of symbols based on the first tree data structure and the set of constraints based on the first tree data structure and an intended level of accuracy of encoding, wherein the set of symbols comprises predicated representing root nodes of the first tree data structure, functions representing internal nodes of the first tree data structure, and constants representing leaf nodes of the first tree data structure;

encode, by the processor, the first tree data structure into the vector based on the set of constraints;

assign, by the processor, an index value to ones of the set of constraints and ones of the set of symbols, wherein the encoding the first tree data structure into the vector is further based on the set of symbols and respectively assigned index values;

decode, by the processor, the vector into a second tree structure by solving a satisfiability problem based on elements of the vector, wherein the satisfiability problem is generated based on a type of tree of the first tree data structure; and output, by the processor, the vector to a machine learning system, wherein the machine learning system utilizes the vector as an input.

18. The computer program product of claim 17, wherein the forming the set of constraints is further based on the set of symbols that comprise a set of predicates and functions of the first tree data structure.

19. The computer program product of claim 18, wherein the index values reference elements of the vector.

* * * * *